United States Patent
Garza

[11] Patent Number: 6,033,606
[45] Date of Patent: Mar. 7, 2000

[54] LIPSTICK MATERIAL RECYCLING APPARATUS AND METHOD

[76] Inventor: Debra J. Garza, 847 W. 20th St., No. 3, San Pedro, Calif. 90731

[21] Appl. No.: 08/888,582

[22] Filed: Jul. 7, 1997

[51] Int. Cl.[7] .......................... B29C 31/04; B29C 39/38; B29C 39/02

[52] U.S. Cl. ........................ 264/36.1; 264/320; 425/803; 425/DIG. 32

[58] Field of Search ................................ 264/36.1, 36.18, 264/299, 319, 320, 328.2; 425/803, DIG. 32, 384, 393

[56] References Cited

U.S. PATENT DOCUMENTS

| | | | |
|---|---|---|---|
| 1,894,863 | 1/1933 | Gubing | 425/DIG. 32 |
| 2,932,386 | 4/1960 | Ushkow | 425/DIG. 32 |
| 3,315,344 | 4/1967 | Niclas | 425/DIG. 32 |
| 3,907,245 | 9/1975 | Linder | 425/803 |
| 4,188,009 | 2/1980 | Gillespie | 425/803 |
| 4,664,615 | 5/1987 | Ohtumi et al. | 425/803 |
| 4,813,801 | 3/1989 | Cardia | 425/DIG. 32 |
| 4,873,078 | 10/1989 | Edmundson et al. | |
| 4,899,977 | 2/1990 | Hempel | 425/803 |
| 4,996,044 | 2/1991 | Mercado et al. | |
| 5,093,111 | 3/1992 | Baker et al. | |
| 5,160,689 | 11/1992 | Kamen | 425/803 |
| 5,316,712 | 5/1994 | Ono et al. | 425/803 |
| 5,468,084 | 11/1995 | Boninsegni et al. | |

OTHER PUBLICATIONS

How to make a Liplstick. It takes both chemistry and artistry.By Janet C. Freed, Self Magazine, Mar. 1997.

*Primary Examiner*—Angela Ortiz
*Attorney, Agent, or Firm*—Christie, Parker & Hale, LLP

[57] ABSTRACT

An apparatus for melting lipstick material includes an enclosure 12 having a heating element 34 and a well 20 next to each other with a metallic member 26 in contact with the well 20 for transferring heat from the heating element to the well 20. A removable container 18 in the well 20 holds lipstick material which becomes molten upon heating. The container 18 has a removable cover that covers an open top of the container 18 and an insulated member 56 for grasping the container 18 while the container 18 is at an elevated temperature. A thermostat 30 regulates temperature so that the lipstick material is heated to a temperature above its melting point, and a stirrer 64 extends into the container 18 to stir the molten lipstick material.

12 Claims, 8 Drawing Sheets

LIPSTICK MATERIAL RECYCLING APPARATUS AND METHOD

BACKGROUND OF THE INVENTION

1. Field of the Invention

This invention relates to an apparatus and method for recycling lipstick material, and particularly, to an apparatus and method which enables unused lipstick material to be retrieved, melted, and remolded.

2. Background Discussion

Lipstick material commonly comes in the form of a solid, cylindrical element which is contained in a hollow, cylindrical, tube-like case with a spindle that allows the lipstick material to be advanced for use from an open end of the case, and then is withdrawn into the case for storage. Approximately one-third of the lipstick material remains in the case and can not be advanced from its open end. This unused material is discarded with the case. Since lipstick is expensive, and it is often highly desirable to match certain hard to find lipstick colors, the waste of almost thirty percent of the lipstick material is a problem, both for the environment and costwise.

SUMMARY OF THE INVENTION

It is the objective of this invention to provide an apparatus and method for recycling unused lipstick material, which is now commonly discarded.

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include a simple way to recycle unused lipstick material, thus saving money and avoiding environmental damage, a compact apparatus that is easy to store and is attractive, and a simple way to enable one to customize lipstick colors as desired.

The first feature of the apparatus of this invention for recycling lipstick material is that it includes an enclosure having a well with a heating element nearby which heats the well. Preferably, the enclosure has a lower section and an upper section which sits on the lower section. The lower section has a top plate with an opening which receives the well with the heating element below the top plate and nearby the well to heat the well. A metallic member which at least partially covers an exterior wall of the well transfers heat to the well from the heating element.

The second feature is a removable container in the well for holding lipstick material which becomes molten upon heating. The container has a removable cover that covers an open top of the container during use. The unusable lipstick material is manually removed from its case, for example, by a spatula which scoops the lipstick material from its case, and deposited in the container which is then placed in the well for heating the lipstick material to its melting point. The unusable lipstick material from three cases may be held in the container, which typically has a capacity of from 4 to 10 milliliters. This material is stirred after melting to blend any pigments which may be added, or to blend the unusable contents of the cases.

The third feature is a thermostat which regulates temperature so that the lipstick material is heated, typically, to a temperature in excess of about 95° F., usually from 120 to 200° F. The duration that the material is heated preferably should not exceed 5 minutes, typically will not exceed 2 minutes. At a temperature ranging between 95 and 200° F. while the lipstick material is molten, this molten material is stirred gently. At a predetermined preset temperature with this range, the thermostat automatically shuts off.

The fourth feature is that a stirrer extends into the container to stir the molten lipstick material. Preferably, this stirrer is removably attached to the cover. It may be manually operated or rotated by electric power. A delivery member is attached to the open top of the container, and it has an open portion in communication with the container and a support portion which, with the container seated in the well, is adjacent to and supported by the top plate. The removable cover is seated on the delivery member to cover the open portion of the delivery member. An insulated member on the container allows the user to grasp the container while the container is at an elevated temperature. For example, an insulated handle may be used which enables the heated container to be removed from the well, so that the molten lipstick material in the container may be safely poured onto a mold, for example, a compact style mold.

The fifth feature is that the cover is seated in a carriage section to allow the cover to be manually rotated within the carriage section. The carriage section and the delivery member are removably attached to each other so that, when attached, the carriage section and delivery member do not rotate relative to each other, but allow the cover to be rotated to turn the stirrer. When the stirrer is power by electricity, it is attached to a gear train connected to an electric motor powered by a battery.

This invention also includes a method of recycling lipstick material. This method includes:

(a) removing unused lipstick material from a lipstick case, (b) placing the unused lipstick material into a container and heating the container until the lipstick material becomes molten, (c) stirring the molten lipstick material, and (d) pouring the molten lipstick material into a mold and allowing the molten lipstick material to solidify in the mold.

DESCRIPTION OF THE DRAWING

The preferred embodiment of this invention, illustrating all its features, will now be discussed in detail. This embodiment depicts the novel and non-obvious lipstick material recycling apparatus and method of this invention as shown in the accompanying drawing, which is for illustrative purposes only. This drawing includes the following figures (FIGS.), with like numerals indicating like parts.

DESCRIPTION OF THE PREFERRED EMBODIMENTS

Figure 1:
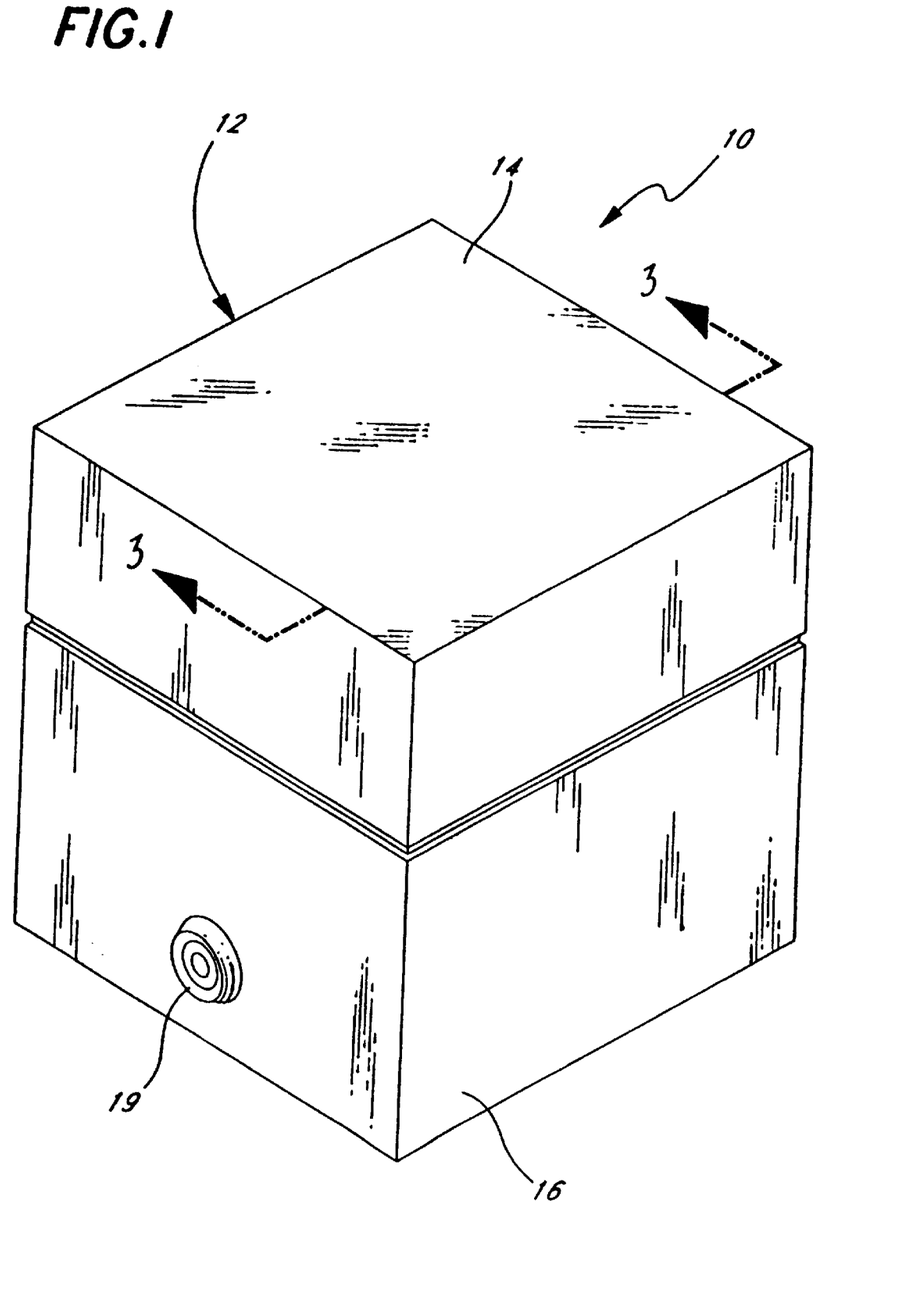
FIG. 1 is a perspective view of the apparatus of this invention.
Figure 2:
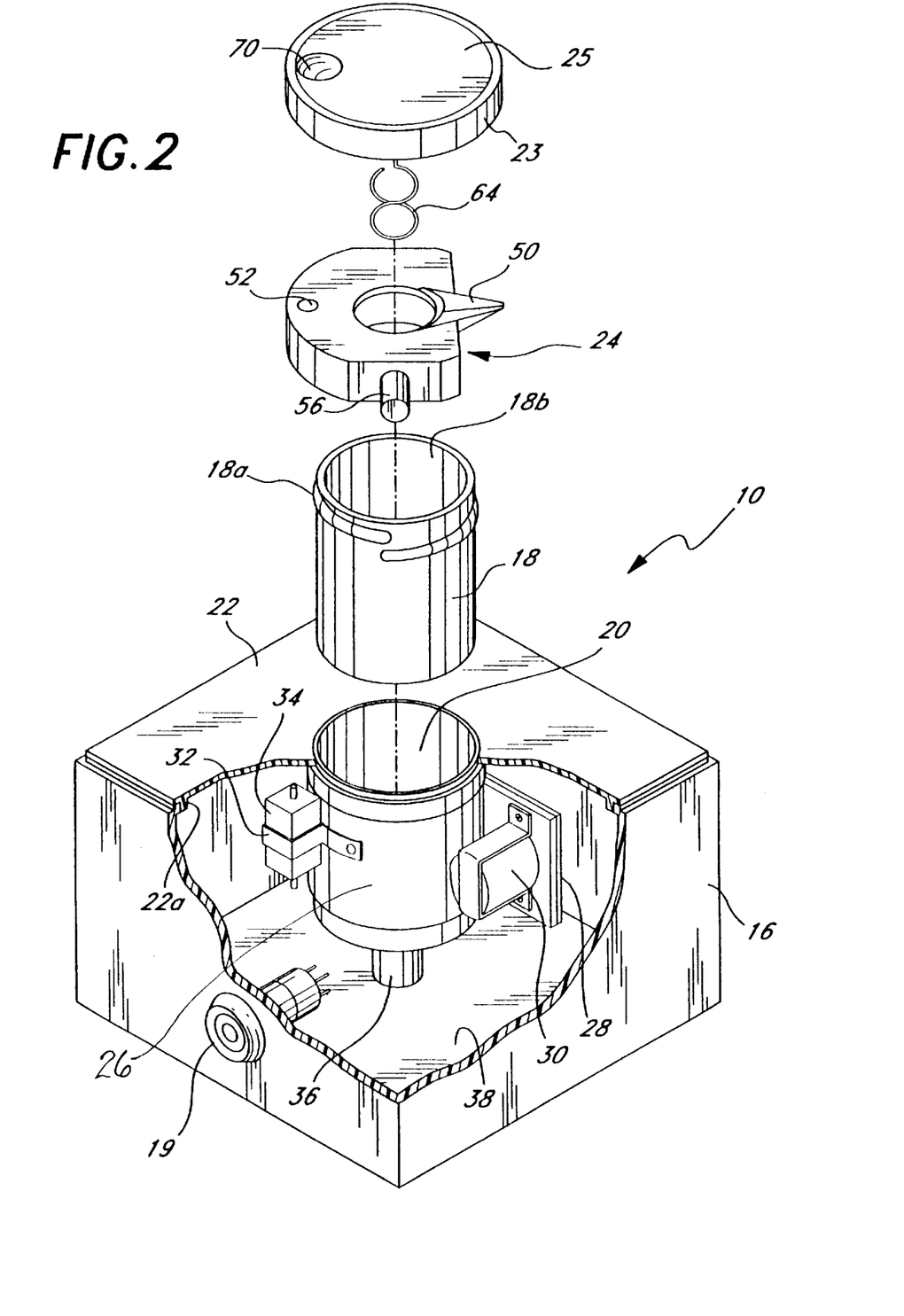
FIG. 2 is an exploded perspective view of the apparatus of this invention, with the upper section removed and sections broken away.
Figure 3:
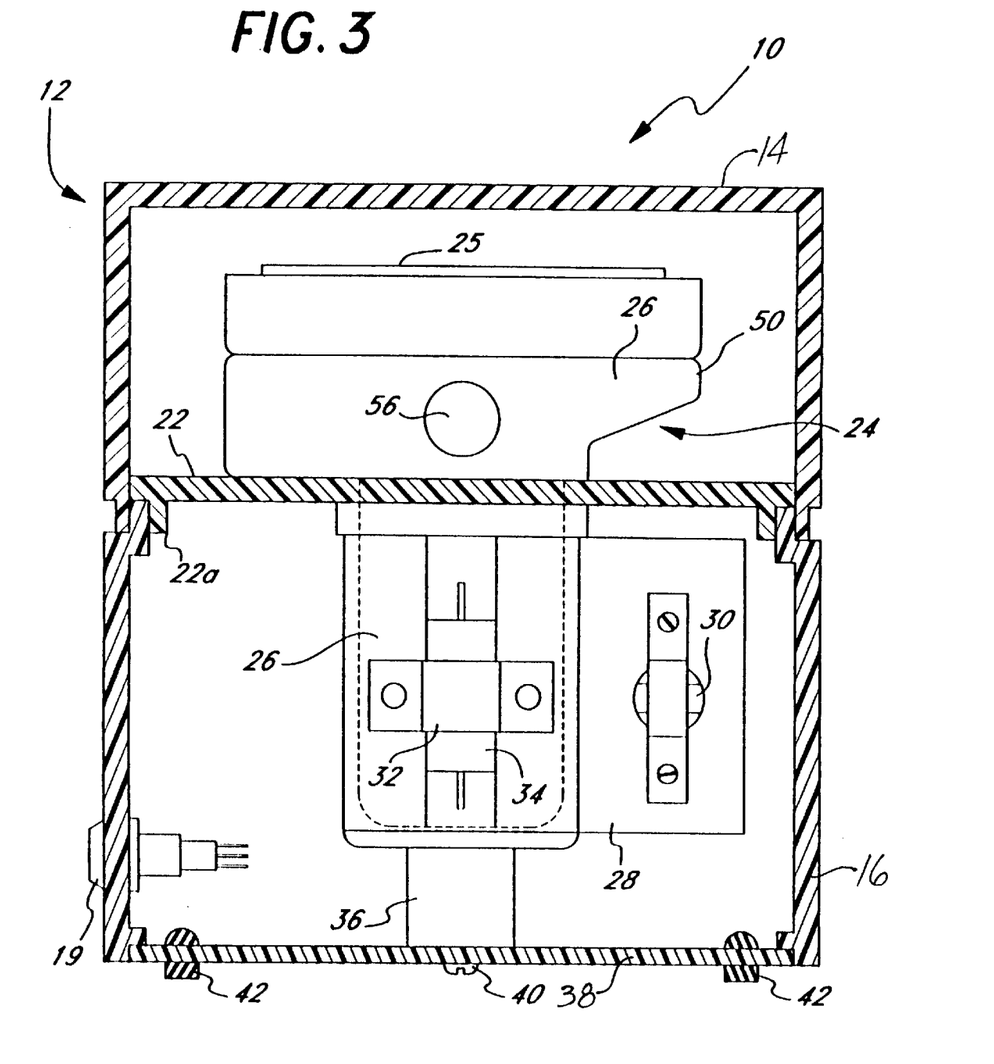
FIG. 3 is a cross-sectional view taken along line 3—3 of FIG. 1.
Figure 7:
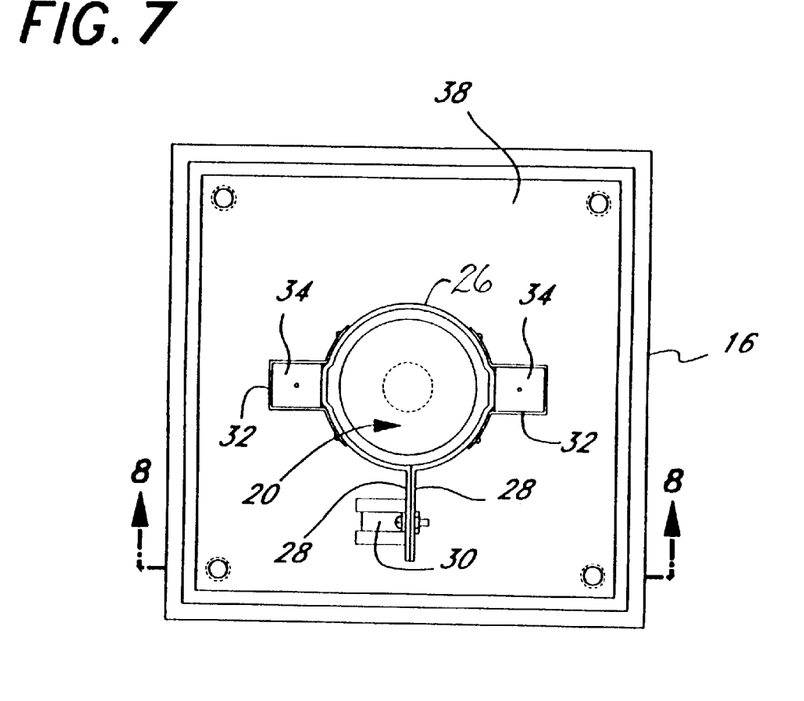
FIG. 7 is a plan view of the lower base section with the top plate removed.
Figure 8:
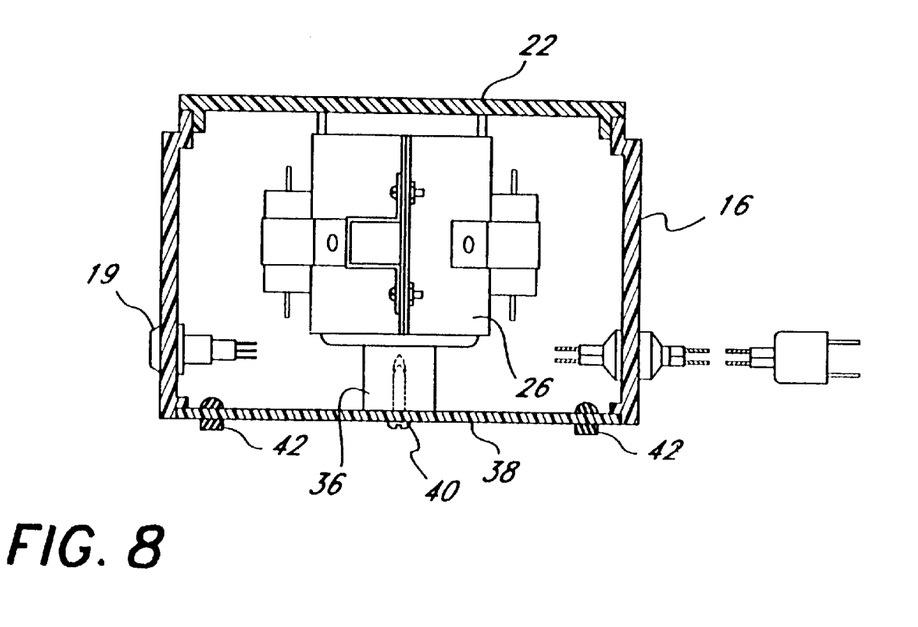
FIG. 8 is a cross-sectional view taken along line 8—8 of FIG. 7.
Figure 13:
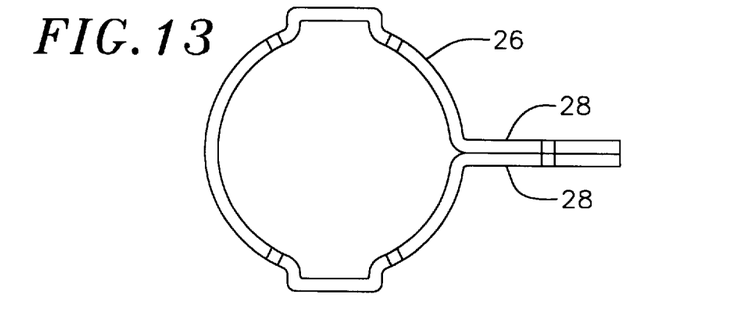
FIG. 13 is a plan view of the heat transfer member surrounding the well for the container.
Figure 14:
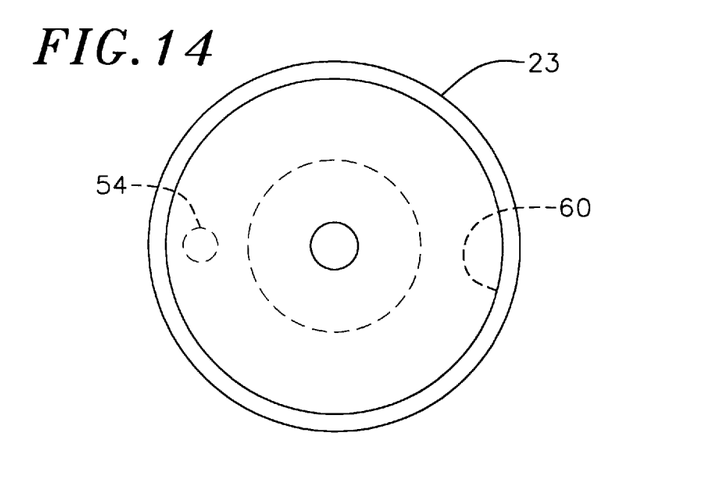
FIG. 14 is a plan view of the carriage section.
Figure 15:
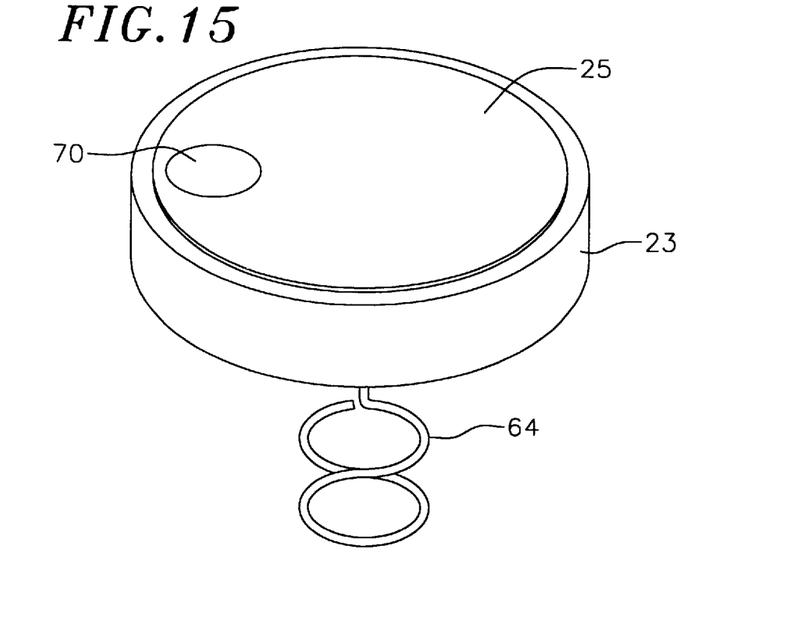
FIG. 15 is a perspective view of the assembly of the cover, carriage section, and stirrer.

As best shown in FIGS. 1 through 3, the lipstick material recycling apparatus 10 of this invention includes a box-like enclosure 12 having an upper lid section 14, which sits on a lower base section 16; a cylindrical container 18, preferably of glass or other heat resistant material, which is removably seated in a well 20 in a top plate 22, which covers the lower base section 16; and a delivery member 24 removably attached to the container 18. A metallic, cylindrical strip 26 (FIG. 13) encircles and contacts the well 20 and has a pair of outwardly extending flanges 28, to which is mounted a thermostat 30 (FIG. 7). Two opposed mounting brackets 32 (FIG. 7) attach to opposite sides of the strip 26 two electrical resistance heaters 34, which are electrically connected (conventional wiring not shown) to the thermostat 30. The thermostat 30 controls the temperature of these heaters 34 so that sufficient heat energy is transferred by the strip 26, a heat transfer element, to the well 20, which heats and melts lipstick material placed in the container 18 seated in the well. The thermostat 30 is adjusted so that the temperature of the lipstick material ranges between about 120 and 130 degrees Fahrenheit. An indicator light 19 on the lower base section 16 is turned on while heaters 34 are on, and turns off when the heaters are shut off.

The well 20 has extending outwardly from its bottom a stand 36 which engages the bottom plate 38 of the lower base section 16 with a screw 40 extending through the plate into the stand to hold the well 20 in position, preferably centrally located in the base section 16. The lid and base sections 14 and 16, top plate 22, well 20, and stand 36 are injected molded, being made of a suitable plastic material such as nylon, preferably nylon 6.6 formulation which has a temperature resistance of from about 180 to about 300 degrees Fahrenheit. The top plate 22 has an internal rim 22a that provides a ledge which allows the plate to rest on top of the side walls of the base section 16. There are preferably four feet 42 made of rubber material that are positioned at the corners of the bottom 38 of the base section 16.

Figures 4, 5, 6:
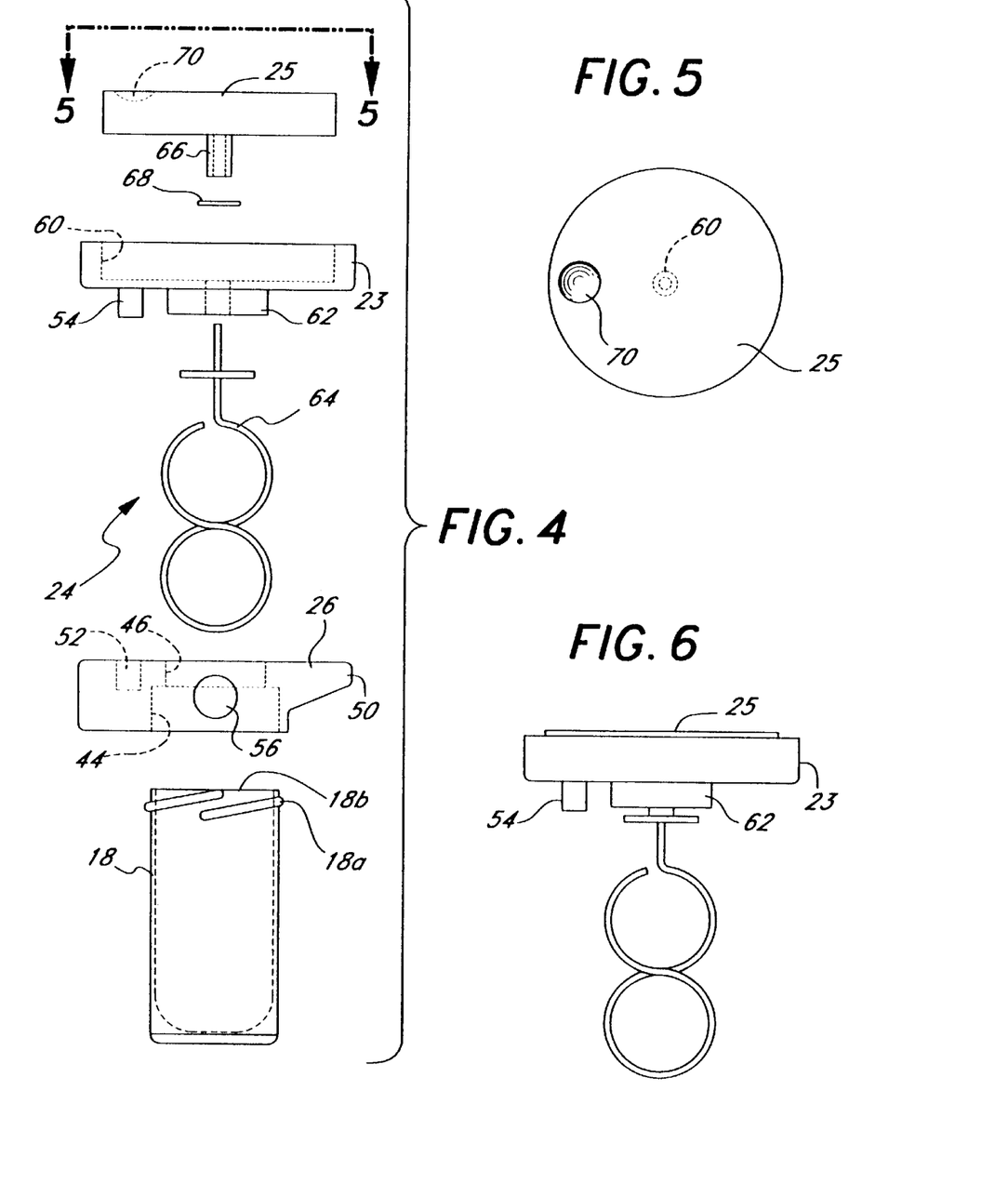
FIG. 4 is an exploded side-elevational view of the assembly of the cover, carriage section, stirrer, spout member, and container.
FIG. 5 is a plan view taken along line 5—5 of FIG. 4.
FIG. 6 is a side-elevational view of the assembly of the cover, carriage section, and stirrer.

As best shown in FIGS. 3 and 4, the delivery member 24 includes a carriage section 23, a circular cover 25 seated in the carriage section, and a spout member 26 on which the carriage section sits. As shown in FIG. 3, the underside of the spout member 26 sits on the top plate 22 when the assembly of the container 18 and delivery member 24, including the spout member 26, are placed inside the enclosure 12.

Figure 9:
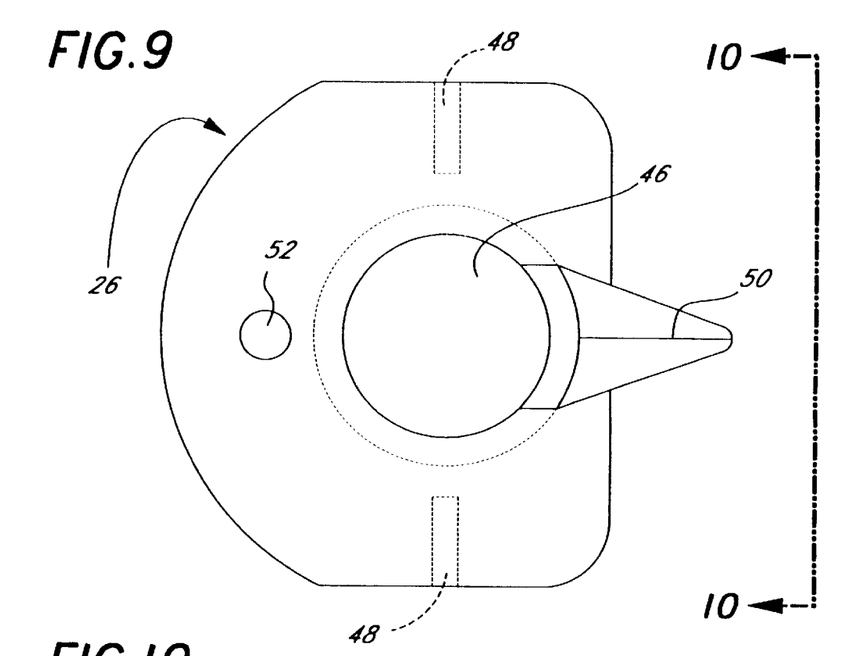
FIG. 9 is a plan view of the spout member.
Figure 10:
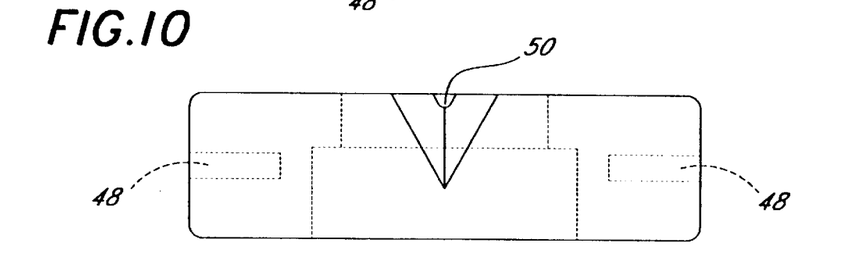
FIG. 10 is a side-elevational view taken along line 10—10 of FIG. 9.
Figure 11:
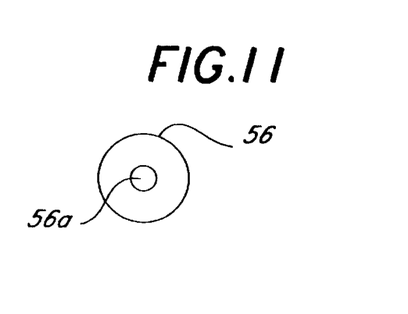
FIG. 11 is a side-elevational view taken along line 11—11 of FIG. 12.
Figure 12:
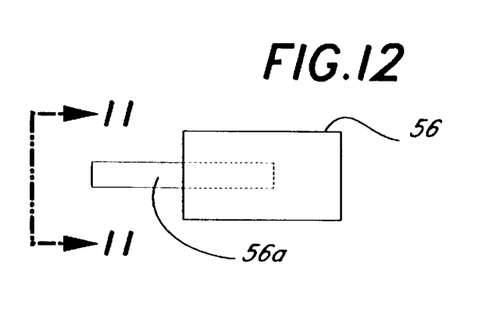
FIG. 12 is a side-elevational view of a handle, which is attached to the spout member.

The spout member 26 has an internal central threaded recess portion 44 that allows the delivery member 24 to be screwed on and off the container 18, which has complimentary threads 18a surrounding its upper open end 18b. As best shown in FIG. 9, the spout member 26 has an enlarged central opening 46 with recesses 48 on opposite external sides of the spout member, and a spout 50 on one side in communication with the central opening 46 that allows molten lipstick material to be poured from the container 18 out of the spout. Opposite the spout 50 on the other side of the opening 46 is a bore 52 in the top surface of the spout member 26 that receives a finger 54 extending outward from the lower side of the carriage section 23. An insulated handle 56 made of a polymeric or rubber material includes a rod 56a which is force fitted into either one of the recesses 48 in the spout member 26, depending upon whether the user is left handed or right handed.

As best depicted in FIGS. 4, 5, 14, and 15, the carriage section 23 has an enlarged central bore 60 which receives the cover 25, which fits snugly in the central bore. There is a plug-like element 62 on the underside of the carriage section 23 that fits into the central opening 46 of the spout member 26 upon assembly of the carriage section and the spout member. A stirrer 64, preferably of stainless steel, in the form of a FIG. 8 is screwed into a threaded receptacle 66 in the cover 25 and its lower portion extends from the underside of the spout member 26 into the container 18 upon assembly. An O-ring seal 68 is provided around the receptacle 66. An indentation 70 in the top surface of the cover 25 allows the user to manually turn the stirrer 64 when the cover 25, carriage section 23, and spout member 26 are assembled, as shown in FIG. 3, with the delivery member 24 supported by the top plate 22.

To use the lipstick recycling apparatus 10 of this invention, the user first removes with a spatula (not shown) unused lipstick material from an exhausted case, recovering as much of the unused material as possible. Typically, the unused lipstick material from two or three exhausted cases are sufficient to reconstitute a single, conventional sized lipstick. When two or three recovered portions of the lipstick material are deposited in the container 18, the spout member 26 is screwed onto the container 18, and then the carriage section 23 is placed on top of the spout member 26 so that the finger 54 is received in the bore 52 and the plug-like element 62 is received in the enlarged central opening 46. The cover 25 is then placed in the enlarged central bore 60 of the carriage section 23 with the stirrer 64 extending into the container 18. The user manually turns the cover 25 when the lipstick material has reached a molten state by placing his or her finger in the indentation 70 to rotate the cover which revolves within the carriage section 23 to turn the stirrer 64. When the contents of the container 18 have been mixed and are liquefied, the user first removes the carriage section 23 including the cover 25 with the attached stirrer 64 and sets this assembly aside. Next, the user grasps the handle 56 and lifts the spout member 26 with the attached container 18 from the well 20. The user then simply pours the contents of the container 18 out of the spout 50 into a mold (not shown). Liquid lipstick material, upon solidifying within the mold, can then be applied using, for example, a lipstick brush. Preferably, the stirrer 64 is cleaned before reuse. If desired, different pigments or dyes may be added to modify the color of the reconstituted lipstick material. Or, fresh lipstick material with pigments and dyes added, as desired by the user, rather than recycling unusable lipstick material is also an option.

Figure 16:
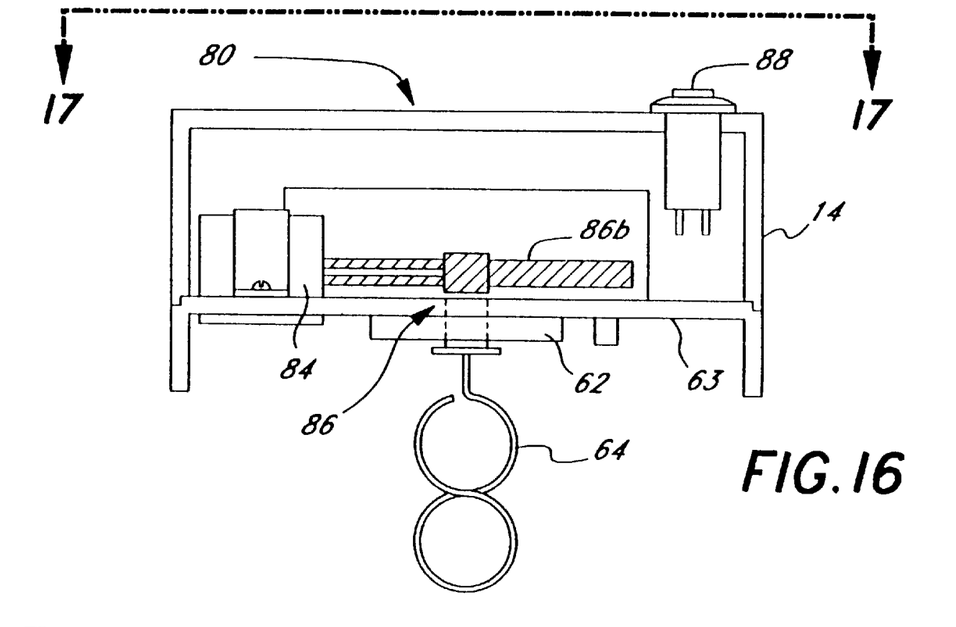
FIG. 16 is a cross-sectional view of the upper lid section of an alternate embodiment of this invention using an electric motor to power the stirrer.
Figure 17:
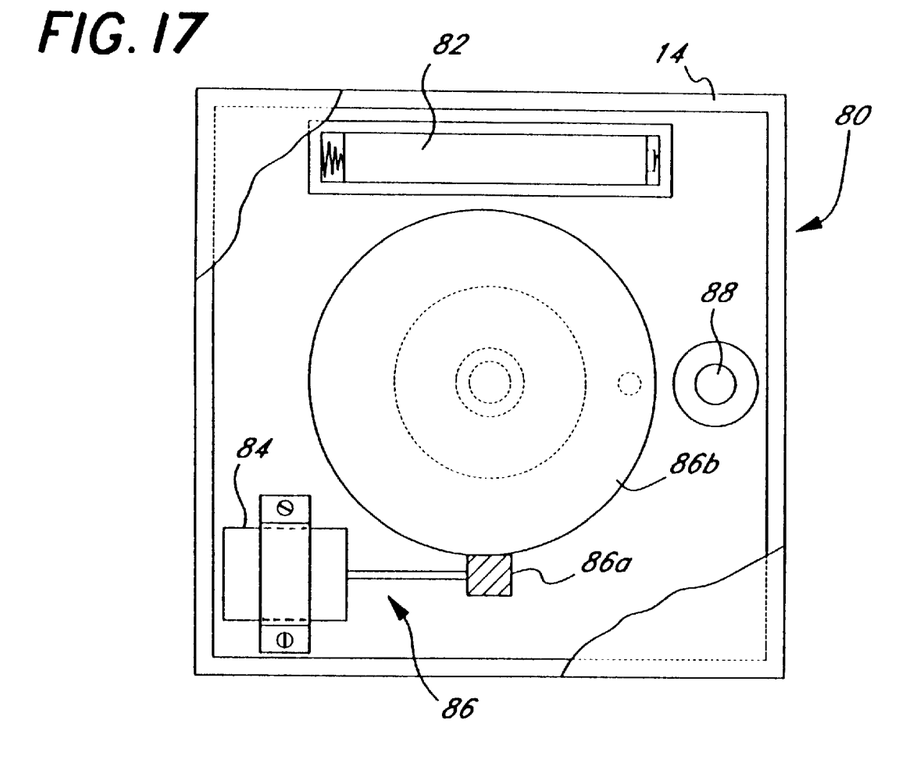
FIG. 17 is a plan view, with the top panel broken away, taken along line 17—17 of FIG. 16.

An alternate embodiment of this invention is shown in FIGS. 16 and 17, where the manual rotatable cover 25 is replaced by a battery operated stirrer 64. In this embodiment, the lid section 14 serves as a cover 80, which includes a plug-like element 62 on the underside of a support plate 63. The plug-like element 62 fits into the central opening 46 of the spout member 26 upon assembly. The cover 80 encloses a battery 82, a drive motor 84, and gear assembly 86 including a small gear 86a turning a central gear 86b which has the stirrer 64 attached to its center. A manually operated push button switch 88 is depressed in order to energize the motor 84 to rotate the gears 86a and 86b to turn the stirrer 64. In this embodiment, upon removing the lid section 14, the stirrer 64 is removed from the molten lipstick material within the container 18, allowing the user to then grasp the handle 56 and pour the contents of the container 18 into a mold.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

I claim:

1. An apparatus for melting lipstick material comprising:
   an enclosure having a lower section and an upper section which sits on the lower section;
   said lower section having a top plate with an opening which receives a well with a heating element below the top plate and nearby the well to heat said well;
   a heat transfer element disposed between the well and the heating element which transfers heat to the well;
   a removable container having an open top, and which passes through the opening in the top plate and into said well for holding lipstick material which becomes molten upon heating;
   a delivery member attached to the open top of the container, said delivery member having an open portion in communication with the container, a support portion which, with the container seated in the well, is adjacent to the top plate, and a removable cover which covers said open upper portion of the delivery member;
   an insulated member for grasping the container while the container is at an elevated temperature;
   a thermostat for regulating temperature so that the lipstick material is heated to a temperature above the melting point of said lipstick material; and
   a stirrer attached to the cover which extends into the container to stir the molten lipstick material.

2. The apparatus of claim 1 where the stirrer is removably attached to said cover.

3. The apparatus of claim 1 where the stirrer is manually operated.

4. The apparatus of claim 1 where the stirrer is operated by electric power.

5. The apparatus of claim 4 where the stirrer is attached to a gear train connected to an electric motor powered by a battery.

6. The apparatus of claim 1 where the cover is seated in a carriage section to allow the cover to be manually rotated within said carriage section.

7. The apparatus of claim 5 where the carriage section and the delivery member are removably attached to each other so that, when attached, the carriage section and delivery member do not rotate relative to each other, but allow the cover to be rotated to turn the stirrer.

8. A method of recycling lipstick material, comprising:
   (a) removing unused lipstick material from a lipstick case;
   (b) providing a container having a removable cover with a stirrer extending into the container when the cover is placed on the container;
   (c) removing the cover and placing said unused lipstick material into the container and heating the lipstick material until the lipstick material becomes molten;
   (d) replacing the cover and stirring with the stirrer the molten lipstick material; and
   (e) pouring the molten lipstick material into a mold and allowing said molten lipstick material to solidify in said mold.

9. The method of claim 8 where the container with said unused lipstick material therein is placed in a well which is heated with heat being transferred to the container to melt said lipstick material.

10. The method of claim 9 where the well has a thermostat for regulating temperature so that the lipstick material is heated to a temperature above the melting point of said lipstick material.

11. The method of claim 10 where there is an insulated member attached to the container for grasping the container while the container is at an elevated temperature.

12. The method of claim 8 where the molten temperature of the lipstick material is from 95 to 200° F.

* * * * *